US006627286B1

(12) United States Patent
Lutz

(10) Patent No.: US 6,627,286 B1
(45) Date of Patent: Sep. 30, 2003

(54) EMBOSSING FOIL, ESPECIALLY HOT EMBOSSING FOIL

(75) Inventor: Norbert Lutz, Rückersdorf (DE)

(73) Assignee: Leonhard Kurz GmbH & Co., Furth (DE)

( * ) Notice: Subject to any disclaimer, the term of this patent is extended or adjusted under 35 U.S.C. 154(b) by 0 days.

(21) Appl. No.: 09/646,513

(22) PCT Filed: Mar. 1, 1999

(86) PCT No.: PCT/DE99/00605

§ 371 (c)(1), (2), (4) Date: Sep. 15, 2000

(87) PCT Pub. No.: WO99/48703

PCT Pub. Date: Sep. 30, 1999

(30) Foreign Application Priority Data

Mar. 26, 1998 (DE) ........................................ 198 13 314

(51) Int. Cl.[7] ............................ B32B 9/00; B32B 33/00

(52) U.S. Cl. ...................... 428/40.9; 428/156; 428/166; 428/167; 428/172; 428/209; 428/202; 428/913; 428/40.1; 29/17.1; 29/18.1

(58) Field of Search ................................ 428/40.1, 156, 428/166–167, 172, 209, 202, 913; 29/17.1–18.1

(56) References Cited

U.S. PATENT DOCUMENTS

| | | | | |
|---|---|---|---|---|
| 4,426,422 A | * | 1/1984 | Daniels | 428/352 |
| 4,477,312 A | * | 10/1984 | Czichy | 156/656 |
| 5,637,172 A | | 6/1997 | Kerr | |
| 5,731,064 A | * | 3/1998 | Suss | 428/195 |

FOREIGN PATENT DOCUMENTS

| | | | |
|---|---|---|---|
| DE | 34 30 111 C1 | | 10/1985 |
| DE | 44 23 291 A1 | | 1/1996 |
| DE | WO 97/30855 | | 8/1997 |
| DE | B 44 C 1/165 | | 9/1998 |
| JP | 09 277 196 A | * | 10/1997 |

* cited by examiner

*Primary Examiner*—Harold Pyon
*Assistant Examiner*—Brian P. Egan
(74) *Attorney, Agent, or Firm*—Hoffmann & Baron, LLP

(57) ABSTRACT

Proposed are stamping foils and processes for the production thereof, which make it possible to form on a carrier film patches which are completely separate from each other and which can be transferred on to a substrate using the procedure which is usual when dealing with stamping foils, wherein the transfer operation can be effected in such a way that no flakes which interfere with subsequent overprinting are formed.

10 Claims, 2 Drawing Sheets

EMBOSSING FOIL, ESPECIALLY HOT EMBOSSING FOIL

This application claims priority based on PCT Application No. PCT/DE99/00605, filed on Mar. 1, 1999 and German Patent Application No. 198 13 314.6, filed on Mar. 26, 1998.

BACKGROUND OF THE INVENTION

The invention concerns a stamping foil, in particular a hot stamping foil, comprising a carrier film on which there is releasably arranged a decoration layer which can be transferred on to a substrate by means of heat and/or pressure and which adhesively sticks to the substrate. The invention also concerns production processes for stamping foils of that kind.

Stamping or embossing foils of that kind are used for the decoration of the most widely varying substrates, in which respect the decoration layer can be of various configurations. Usually however the decoration layer of stamping foils comprises at least one protective lacquer layer portion which, after the decoration layer is applied to the substrate, forms the free outward side, as well as further layer portions forming the actual decoration elements. In general the layer portion of the decoration layer, which is furthest away from the carrier film, forms an adhesive layer portion, by means of which the decoration layer then adheres to the substrate. Stamping or embossing foils of quite special decoration have also been used for some years to a quite considerable extent in order to provide items of value or value documents, for example banknotes, cheques, value papers such as securities and bonds, credit cards etc, with an additional security feature which can only be forged with difficulty. For security purposes, hot stamping foils provided with so-called 'OVDs' (Optically Variable Devices) are used to a quite considerable extent. For that purpose the decoration layer of the stamping foil usually has a generally thermoplastically deformable layer portion, into which then a structure having an optical-diffraction effect, for example a suitable grating structure, is replicated in the course of production of the stamping foil. In order to make a structure with an optical-diffraction effect of that kind as clearly visible as possible, the usual practice in a large number of cases is that the suitably structured surface of the deformable layer portion is provided with a reflection layer portion which is distinguished in that its refractive index is substantially different from that of the layer portion of the decoration layer, against which the reflection layer bears. In most cases a metal layer portion which is generally applied by vapour deposition is used as the reflection layer portion.

Stamping or embossing foils of that kind are described in DE 44 23 291 A1 as state of the art.

SUMMARY OF THE INVENTION

In particular for security uses it may now be desirable for a security element formed by the decoration layer of a stamping foil to be also overprinted after it has been applied to the substrate, for example a banknote, in order in that way to make forgery thereof even more difficult. Now, in principle there are two possible ways of transferring the decoration layer from the carrier film of the stamping foil on to the substrate, more specifically, either transfer of the decoration layer in strip form by means of a suitable roller or the like, or patch-wise application of suitable regions of the decoration layer to the substrate. Hitherto, it was generally assumed that at least one layer portion of the decoration layer of the stamping foil is present over a large surface area, in which case the corresponding spot or patch is produced on the substrate by a procedure whereby the decoration layer is stamped on to the substrate by means of a suitably shaped stamping punch. With that method of stamping or transferring the decoration layer from the carrier film of the stamping foil on to the substrate however, the decoration layer of the stamping foil is generally torn along the edge of the patch to be transferred, from the regions of the decoration layer which remain on the carrier film and which are pulled off the substrate together with the carrier film after the stamping or embossing operation. A corresponding consideration applies in the situation where, when implementing the transfer operation by means of a roller, the track produced by the roller is of narrower width than the strip of decoration layer present on the carrier film. When regions of the decoration layer are torn away or torn out during the stamping transfer operation, small particles which come off in splinters, so-called flakes, very frequently occur, and in the subsequent printing operation, under some circumstances they can cause quite considerable problems and difficulties. In that respect, it is to be borne in mind that it is precisely in the case of security elements that the decoration layer is metallised at least in a region-wise manner. The flakes cause problems and difficulties in particular for the reason that they result in contamination of the printing machine and thus in untidy and blurred printing. The printing which is subsequently applied to a security element is in fact also frequently very finely structured. Suitable cleaning of the machine in which under some circumstances the stamping operation on the one hand and the over-printing operation on the other hand are effected in succession, between the stamping operation and the printing operation, is not possible, at least at reasonable cost.

Therefore the aim of the invention is to propose a stamping foil and a process for the production thereof, which make it possible to apply a suitable decoration layer to a substrate, in the form of individual patches, without the fear that troublesome flake formation occurs. At the same time, the invention seeks to provide that a suitable stamping foil can be produced with a very good degree of accuracy and register relationship of the various layer portions, which are possibly provided, of the decoration layer.

To attain that object, in accordance with the invention, there is proposed a stamping foil of the kind set forth in the opening part of this specification, in which the decoration layer is divided into individual patches which are completely separate from each other and which are individually transferable on to a substrate, wherein provided around each of the individual patches on the carrier film is a respective free space, in particularly simple fashion in the form of a border or edging, of a width of at least 1 mm, preferably at least 2 mm, in which the decoration layer material initially present in the intermediate spaces is subsequently removed so that the carrier film is exposed there.

In accordance with the invention a stamping foil of that kind is desirably produced in such a way that the materials forming the decoration layer are applied to the carrier film in a manner known per se from the production of stamping foils, in such a fashion that the decoration layer projects everywhere beyond the edge of the transferable patches to be formed, and that, to form the free spaces, decoration layer material is subsequently removed along the entire edge of each individual patch.

The stamping foil according to the invention or the stamping foil produced by the process in accordance with the invention is therefore distinguished in that the precise delimitation and definition of the patches to be transferred on to the substrate is achieved by subsequent removal of the regions of the decoration layer, which extend beyond the desired patch region. That has in particular the advantage that the stamping foil, as it is used for transfer of the decoration layer patches on to the substrate, has suitable decoration layer portions only where transfer is actually to be effected. Therefore, when the corresponding patches of the decoration layer are transferred on to the substrate, that no longer involves separating the decoration layer out of a larger surface portion. Consequently, there is no possibility of troublesome flake formation taking place. Even if flakes should occur in the subsequent operation of removing the decoration layer, in the region of the free spaces, it is readily possible, for example by means of a suction removal device which is known per se for installations for processing by means of laser radiation, to remove those flakes from the stamping foil before the stamping foil is packaged and supplied to the user. There is no possibility of the printing machine being contaminated by corresponding flakes.

A further advantage of the procedure in accordance with the invention is that it is possible under some circumstances to eliminate register problems. That applies in particular for the situation where a structure having an optical-diffraction effect, or another structure, is to be replicated in a layer portion of the decoration layer. Admittedly, it is possible to produce printing in really accurate relationship, that is to say for example it is possible for the lacquer layer portions which usually form the decoration layer to be so precisely applied that they are present only where there is a wish for a corresponding patch which is to be transferred on to the substrate. If then however a corresponding structure is to be replicated in one of the lacquer layer portions, it is necessary to operate at comparatively high temperature, whereby in most cases the carrier film is severely stretched, and that results in inaccuracies in regard to positioning of the decoration layer surfaces. That then results for example in lengthwise or lateral displacement of the replicated pattern with respect to the lacquer layer portion of the decoration layer, and that can certainly result in the replication not involving the entire layer portion of the decoration layer, where it was intended to be present, because there is a displacement between replication on the one hand and the lacquer layer on the other hand. Even if however in such a case a suitable structure is embossed in the lacquer layer over a large surface area or over the entire surface area, it must be considered that, because of the increase in temperature, either the patches mutually change in position relative to each other or in particular the shape and size of the decoration layer patches change in an undesirable fashion. Those influences however can be disregarded if the decoration layer which is already of the appropriate configuration, that it to say it has the various layer portions and possibly a replicated structure, is applied in the form of patches whose dimensions are larger than those of the definitively desired patches, and the definitive shape and size of the decoration layer patches are then produced by completely removing the decoration layer materials in free spaces, at least in boundaries around the patches, outside the desired region.

In accordance with the invention therefore it is possible to eliminate not just the problem of flake formation when applying embossing out of a decoration layer of large surface area. In addition, the level of accuracy in regard to size, configuration and positioning of the decoration layer patches can also be improved, and that permits a rise in the quality of the articles provided with corresponding patches, for example banknotes and the like. In that respect, it is to be borne in mind that the subsequent removal of the decoration layer material can be very accurately controlled, in terms of precise positioning, for example by way of suitable marks on the carrier film. In that respect, the intended free spaces around the patches ensure that in actual fact only one respective patch is transferred on to the substrate, even if the tool provided for stamping or embossing the patches on to the substrate should be somewhat larger than the patch dimensions, and that can be desirable in order to ensure that the patches are pressed against the substrate cleanly and properly along their edges and are suitably connected thereto. Otherwise, there would in fact be the danger that, during further processing of the article already provided with suitable decoration layer patches, regions of the decoration layer which do not adhere firmly to the substrate are detached therefrom and then again form troublesome flakes.

The operation of removing the decoration layer material in the free spaces can be implemented in various ways, but in that respect some operating procedures are particularly desirable and appropriate.

In that respect in accordance with the invention it is provided for example that, after the application of the material layer portions forming the decoration layer, for the purposes of forming the free spaces or a border along the edge of the individual patches, a strip of the decoration layer, which is at least 1 mm wide, is completely removed from the carrier film by means of laser radiation. The use of laser radiation for removing the strip of decoration layer has the advantage that in principle it is possible to produce the most widely varying geometrical shapes. Furthermore, removal using laser radiation is very accurate and fast. Finally, it affords a very clean and tidy, exact edge for the patches, whereby flake formation is reliably prevented.

Depending on the material used, it is possible to employ the most widely varying known lasers, in which respect the laser which is respectively employed in any given situation is determined in dependence on what layer portions are present. For the purposes of coupling in energy, it is necessary for the laser radiation to be at least partially absorbed in the material used. If the levels of laser radiation intensity are too low, the material is only increased in temperature, whereas when higher levels of intensity are used, the material is fused, decomposed or vaporised. If the stamping foil for example comprises lacquer layer portions arranged on polyester foils as the carrier film, which are transparent in the visible and near infra-red spectral range, it is then desirable for lacquer layer portions of that kind to be removed by excimer laser radiation, more specifically because of the property of the lacquer layer portions to absorb UV-radiation. If in contrast strongly absorbent layer portions, in particular metal layer portions, are involved, they can also be properly removed by means of Nd:YAG- or diode lasers.

It will be appreciated that it is possible for the structure of the stamping foil to be matched or adapted to the laser radiation which is intended to be used. For that purpose, in accordance with the invention, for example a stamping foil can be such that the carrier film is transparent while the decoration layer has at least one layer portion of material which absorbs laser light of the wavelength used for the removal operation, for example a metal layer portion or a suitable lacquer layer portion.

If, when the stamping foil is of such a structure, an Nd:YAG- or diode laser is used for the removal operation, then corresponding removal of material will occur in the region of the metal layer portion or the laser light-absorbent materials, while the laser light produces little effect in the regions where there are no correspondingly absorbent materials.

In this connection, in an advantageous operating procedure, (only) the regions of the decoration layer, which are to be subsequently removed to form the free spaces, have a layer portion of a material which more strongly absorbs the laser radiation used for the removal operation, than the other materials used for the decoration layer, and the carrier film, whereby when laser radiation acts on the decoration layer, it causes removal only of the regions in which the more strongly absorbent layer is present, in which case the action of the laser radiation is terminated after removal of the desired regions. If the absorbent materials are present only in the regions to be removed, that has the advantage that the laser beam does not have to be moved precisely in accordance with the free spaces or it does not have to be focussed on to the free spaces. On the contrary, it is possible to operate with a laser beam of larger diameter or with substantially lower demands in terms of the positional accuracy of the laser beam, in which case then the precise geometry of the free spaces is already determined by the absorbent layer regions which are incorporated into the decoration layer.

The absorbent materials can be provided in widely varying ways. In accordance with the invention, it is proposed for example that the carrier film and/or a layer portion adjacent the carrier film are formed by a material which absorbs laser radiation, in which case, when using a particular absorbent layer portion, that layer portion could be provided only in the region of the free spaces to be produced. If in that case an additional laser radiation-absorbent layer is to be provided, a clever operating procedure is to be adopted whereby the carrier film carries a lacquer layer portion which absorbs the laser radiation used for removal of the decoration layer and on which the decoration layer is detachably arranged. In that case, the laser radiation destroys the radiation-absorbent lacquer layer portion, whereby at the same time the decoration layer is also removed in the corresponding regions from the carrier film or is detached therefrom and can then possibly be easily suitably taken away in a further step.

Depending on the laser used, in particular the available power, intensity distribution and mode of operation, it will also be necessary to decide how the laser acts on the stamping foil in order to remove the decoration layer material in the free spaces.

One possibility in that respect is that a laser beam which moves over the regions to be removed is used for removal of the decoration layer. That operating procedure will be adopted when employing a comparatively low-power laser, in order to be able to operate with comparatively small beam diameters, for the purposes of achieving the required intensity. The movement of the laser beam also appears appropriate when the laser radiation-absorbing material in the stamping foil is present not only in the regions where free spaces are to be produced by the removal of material, but also in other regions.

If in contrast the geometry of the patches is predetermined by a suitable geometrical arrangement of absorbent material layer portions in the stamping foil, it is then possible to use laser beams of larger diameter, insofar as the required level of intensity is still achieved in that case. In that situation, those laser beams can also be moved, but it is certainly also possible to adopt an operating procedure in which the stamping foil is irradiated with laser beams of comparatively large diameter, which are substantially stationary.

Another possibility which can also be employed only when using lasers of comparatively high power would provide that the operation of removing the decoration layer is implemented by using a laser beam whose shape corresponds to the shape of the respective free space to be removed around a patch. That operating procedure is appropriate in particular when the patches are of a regular shape, for example in the shape of an oval, a circle or a polygon. In that case, a suitable optical system produces an appropriate laser beam ring which then acts on the stamping foil only in the region of a border around the corresponding patches, and thereby removes the material.

In principle, in connection with the possible removal of lacquer layer portions—and that is what is generally involved in regard to the decoration layers of a stamping foil—it is known that organic lacquers can be very well removed from substrates, for example metals, by excimer laser radiation. That is possible because polymers generally absorb very well in the UV-range and very high levels of intensity are achieved with excimer lasers. The use of excimer lasers is desirable for the reason that such lasers have very high levels of pulse output and correspondingly short pulse durations.

It was found in tests that lacquer layer portions and metal layer portions of stamping foils can be removed from a carrier film, in particular the polyester foils which are usually employed for that purpose, by means of KrF-excimer laser radiation ($\lambda$=248 nm). In that respect it is possible to remove material over a large area and also only to remove surface portions, for which purpose suitable beam shapes are projected on to the substrate, wherein the corresponding beam shapes are produced for example by means of suitable optical systems or by mask projection.

As already mentioned, it would be possible to project the laser beam in ring form on to the stamping foil by means of an optical system, and only to remove a corresponding border portion around each respective patch. In that case, no relative movement as between the laser beam and the foil is required or allowed. It will be noted that this makes it necessary to provide for orientational adjustment of the laser beam if a plurality of laser pulses are needed for the removal operation. If in that case a mask which is projected by means of a lens on to the stamping foil is used to produce the border or the ring, that involves the disadvantage that a large part of the energy of the laser beam is not used for removal of the decoration layer material but is absorbed or reflected by the non-transparent region of the mask. Alternatively therefore consideration should be given to converting the excimer laser beam into a ring by means of a special diffractive optical system, whereby the level of process efficiency can be substantially enhanced and larger surface areas can be dealt with.

Due to absorption of the laser radiation or due to the absorbed energy, the temperature of the material which absorbs the radiation is raised and the material vaporises at higher levels of intensity. In that respect, it is to be assumed that energy densities of >0.3 J/cm$^2$ and a plurality of laser pulses are required for lacquer layer portions on polyester carriers. It will be appreciated that, the higher the level of energy density (and thus the smaller the surface area being processed), the lower is the number of laser pulses which are required for total removal of a corresponding material layer portion. For example, a surface area of 10×10 mm$^2$ and possibly even more can be removed by means of five laser pulses of a KrF-excimer laser and when using suitable materials for the decoration layer. Under the above-discussed circumstances, it is possible to remove a surface area of 3×3 mm$^2$ by means of a single laser pulse.

It is to be noted however that excimer laser radiation also acts on the polyester foil which in fact absorbs UV-radiation, and destroys that foil, so that in this case the irradiation operation may only be effected from the decoration layer side and it must be terminated as soon as the material layer portions which constitute the decoration layer are removed.

It was further found in tests that the decoration layer of stamping foils having a metal layer portion, wherein the metal layer portion is disposed between suitable lacquer layer portions, can be removed both by means of Nd:YAG-lasers and also by means of diode lasers. In that case however, in contrast to processing using an excimer laser beam, the laser beam is generally moved relative to the stamping foil, for which purpose it is possible to use galvanometer mirrors which operate in a practically inertia-less fashion. That makes it possible to achieve very high processing speeds. That mode of operation also enjoys the advantage that the removal geometry can be adjusted in a highly flexible fashion by suitable programming of the mirror actuating means, while the software used for control of the mirror movement can also take account of the movement of the embossing foil web when it passes through a suitable production machine.

In principle the following lasers are used for the removal of materials:

| Laser | Wavelength | Operating mode | Use |
|---|---|---|---|
| $CO_2$-laser | 10.6 $\mu$m | cw, pulse | Industry |
| TEA-$CO_2$-laser | 10.6 $\mu$m | Pulse | Industry |
| Nd:YAG-laser | 10.6 $\mu$m | cw, pulse | Industry |
| Diode laser | 650–900 nm | cw, pulse | Laboratory |
| OPO-systems | 400–700 nm (variable) | Pulse | Laboratory |
| Excimer laser | 193, 248, 308 nm | Pulse | Industry |

Because of the great wavelength and the comparatively great level of thermal damage, $CO_2$- and TEA-$CO_2$-lasers are only limitedly suitable for the removal of decoration layers.

The following particularities are to be expected, depending on the lasers used:

Laser Used: Excimer Laser

| | |
|---|---|
| Wavelength | 248 or 308 nm |
| Mean laser power | 80 W |
| Pulse frequency | 200 Hz |
| Absorption in lacquer layer portions | yes |
| Absorption in a metallisation | yes |
| Absorption in polyester (usual carrier film) | yes |
| Possibility of irradiation through the polyester | no |
| Relative movement between laser beam and foil required | no |
| Beam adjustment required | in the case of a plurality of pulses |
| Beam position correction | costly |
| Processing time for 9 $mm^2$ (1 pulse) | 5 ms |
| Processing time for 100 $mm^2$ (5 pulses) | 25 ms |
| Processing time for a usual OVD | 50 ms |
| Adaptability to variable geometries | costly, replacement of optical elements |
| Multi-track arrangement | conceivable but costly |
| Processing quality | very clean edges |

Laser used: Nd:YAG-laser

| | |
|---|---|
| Wavelength | 1064 nm |
| Mean laser power | 50 W |
| Pulse frequency | some kHz |
| Absorption in lacquer layer portions | no |
| Absorption in a metallisation | yes |
| Absorption in polyester (usual carrier film) | no |
| Possibility of irradiation through the polyester | yes |
| Relative movement between laser beam and foil required | yes |
| Beam adjustment required | yes |
| Beam position correction | possible |
| Typical removal rate | 800 mm/s |
| Processing time for a square, edge length 3 mm | 15 ms |
| Processing time for a square, edge length 10 mm | 50 ms |
| Processing time for a usual OVD | 125 ms |
| Adaptability to variable geometries | simple |
| Multitrack arrangement | relatively simple, e.g. by means of glass fibres |
| Processing quality | medium edge quality |

Laser Used: Diode Laser

| | |
|---|---|
| Wavelength | 650 to 900 nm |
| Mean laser power | 50 W |
| Pulse frequency | some kHz |
| Absorption in lacquer layer portions | no |
| Absorption in a metallisation | yes |
| Absorption in polyester | no |
| Possibility of irradiation through the polyester | yes |
| Relative movement between laser beam and foil required | yes |
| Beam adjustment required | yes |
| Beam position correction | possible |
| Typical removal rate | 800 mm/s |
| Processing time for a square, edge length 3 mm | 15 ms |
| Processing time for a square, edge length 10 mm | 50 ms |
| Processing time for a usual OVD | 125 ms |
| Adaptability to variable geometries | simple |
| Multitrack arrangement | relatively simple, e.g. by means of glass fibres or a plurality of laser heads |
| Processing quality | medium edge quality |

When using OPO-systems, the results to be expected are similar to those with excimer and diode lasers.

Depending on the laser radiation used and the above-discussed actions, it is possible to achieve particular effects by specific and controlled variation of the absorption properties of the decoration layer materials and the specific arrangement thereof. For example, by adding absorbers (for example $TiO_2$) or by a variation in the binding agent system, it is possible to achieve absorption in the range of the wavelengths of Nd:YAG- or diode lasers respectively. In that respect, it is useful if the decoration layer portion which is an absorbent layer portion or which is made into an absorbent layer portion is arranged as closely as possible to the carrier film. More specifically, the absorbed laser radiation increases the temperature of that layer portion, in which case the layer portions disposed thereover are then correspondingly removed by liquefaction, gas formation, vaporisation and so forth.

When modifying the laser portions and laser radiation it must be borne in mind that colour changes possibly take place or clouding effects may occur, both in respect of the decoration layer portions and also the carrier film.

It will be appreciated that removal of the decoration layer in the region forming the free spaces is not only possible by laser radiation, in the above-discussed fashion. For example, it could also be envisaged that, at its free surface which is remote from the carrier film, the decoration layer is provided with a solvent-resistant mask which corresponds to the size of the respective patch; in that case, in accordance with the invention, the procedure adopted is such that, after the decoration layer is covered by the mask, the materials forming the decoration layer are removed in the non-covered regions by the action of suitable solvents or etching agents. It will be appreciated however that this operating procedure presupposes that suitable installations are available, in particular if etching agents are to be used.

Furthermore, it would also be possible for the operation of removing the decoration layer material to be effected in another fashion, for example by direct mechanical action (blasting with small particles) or by the use of lacquer layer portions which can be washed off, in the region of the free spaces. Finally, for removal of the decoration layer in the free spaces, it would also be possible to use a taker element or receiving element, for example a taker or receiving foil, which is provided with an exposed adhesive layer in a pattern corresponding to the free spaces of the stamping foil according to the invention; when the taker or receiving element is pressed against a stamping foil provided with a decoration layer of large area, the decoration layer material or the decoration layer, in the regions thereof in which the taker or receiving element is pressed thereagainst or in which the corresponding adhesive layer is present on the taker or receiving element, adheres to the adhesive layer on the taker or receiving element so firmly that, upon subsequent separation of the stamping foil and the taker or receiving element, the decoration layer is entrained in the regions in which the taker or receiving element adheres thereto, and as a result is completely detached from the carrier film of the stamping foil, in the regions which form the free spaces.

The concept of the invention is particularly desirably used when the aim is to provide stamping foils in which the decoration layer has at least one thermally deformable layer portion into which a spatial structure having an optical-diffraction effect is embossed; in that case, the configuration is desirably such that the thermally deformable layer is transparent and, on its surface which is remote from the carrier film and which bears the spatial structure, it is covered at least in a region-wise manner by a contrast layer portion which improves the discernibility of the spatial structure, the contrast layer portion preferably being formed by a metal layer portion. Stamping foils of that kind can be used in particular as optically variable security elements (OVDs), for example for enhancing the safeguards against forgery of banknotes, value papers such as bonds or stocks and shares, credit cards or cheques; it is precisely because of the presence of a metal layer portion, that particularly critical flakes can be produced when the individual OVD is embossed or stamped out of a larger decoration layer in the hitherto conventional manner In accordance with the invention, for the production of OVD-stamping foils of that kind, the procedure adopted is such that the thermally deformable layer portion is applied in regions extending everywhere over the patch edge (periphery of a desired OVD) and the spatial structure is embossed over a correspondingly large area, that is to say over the entire thermally deformable layer portion, before material is then removed along the patch edges to produce the individual patches. Advantageously, the procedure involved is such that at least individual layer portions of the decoration layer are applied to the carrier film over such a large surface area that the regions of. a plurality of patches are covered, whereupon the free spaces are then produced by subsequent removal of material, in which case it is even possible for at least individual layer portions of the decoration layer to be applied over the full surface area to the carrier film.

It is precisely in the case of OVDs that it is highly important for the spatial structure which generally has an optical-diffraction effect to be precisely identical in terms of its size and orientation, to the patch forming the OVD. If the attempt is made to achieve that by applying suitable patches of lacquer forming the decoration layer to the carrier film, there must be a fear that, upon subsequent replication, for which purpose the deformable lacquer carrying the structure and therewith the carrier film must be suitably heated, the carrier film will be displaced, under some circumstances to a not inconsiderable degree, relative to the desired position, for example because the carrier film shrinks or distorts and stretches. That makes it difficult to achieve accurate orientation of the replication die with respect to the patch consisting of thermoplastic lacquer, and comparatively wide tolerances have to be accepted. If however in accordance with the invention the replication operation is effected with a comparatively large die, precise orientation of the structure pattern with respect to the edge of the OVD can be comparatively well implemented at a later time, by a procedure whereby the laser beam used for the removal operation, or another removal element, is suitably accurately positioned with respect to the structure, which is possible for example by certain elements of the structure being sensed and used as register marks for clear and clean positioning of the laser beam or the like.

BRIEF DESCRIPTION OF THE DRAWINGS

Further details of the stamping foils according to the invention and suitable production processes are described in greater detail hereinafter with reference to the drawing in which:

FIG. 4 is a plan view on an enlarged scale of a small stamping foil region as shown in FIG. 1, in which four patches meet, FIGS. **5*a* and 5*b* are views in section taken along line V—V in FIG. 4 through a first embodiment of a stamping foil, wherein

DESCRIPTION OF THE PREFFERED EMBODIMENTS

Figure 1:
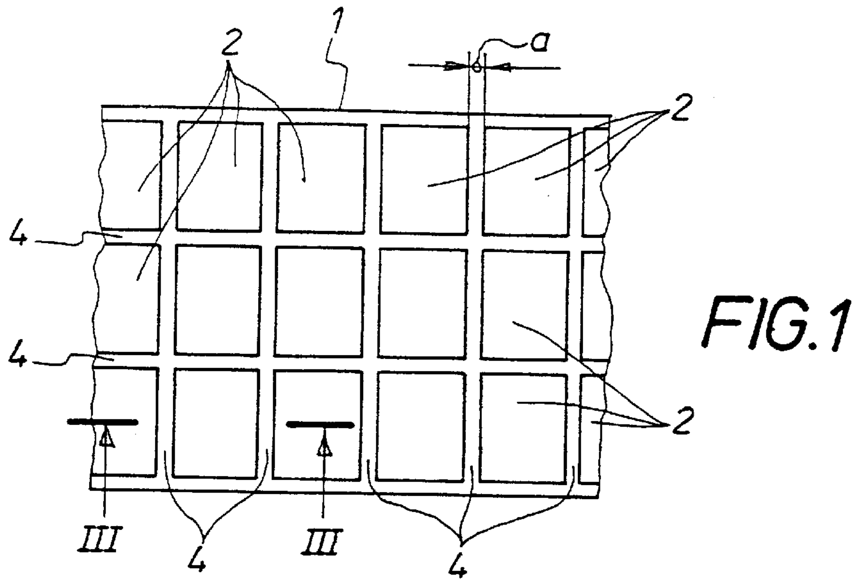
FIG. 1 is a plan view of a part of a stamping foil with patches serving for example as OVDs.
Figure 3:
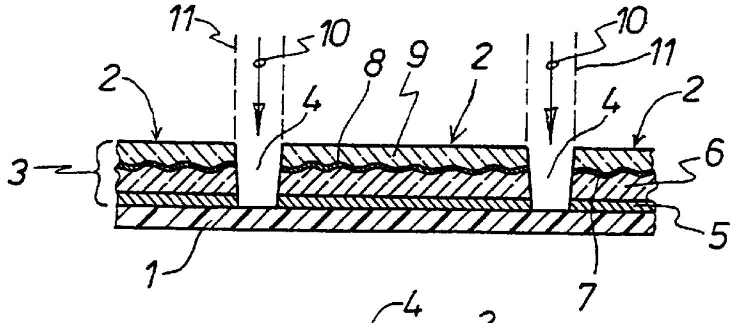
FIG. 3 is a view in section taken along line III—III in FIG. 1.
Figure 4:
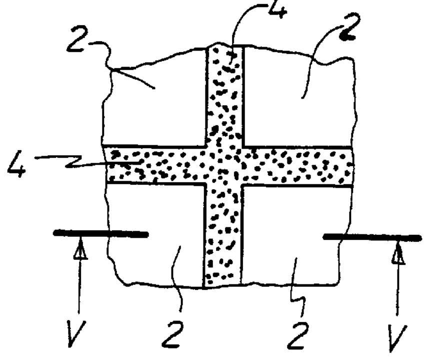

Referring to FIGS. 1 and 3 shown therein is a stamping or embossing foil according to the invention. It includes a carrier film 1, for example a conventional polyester film which is about 20 $\mu$m in thickness. As FIG. 1 shows, arranged on the carrier film 1 are a plurality of patches 2 of a decoration layer which is generally identified by reference numeral 3 and which in respect of its structure and configuration (sequence of layer portions, materials), corresponds to per se known stamping foil decoration layers. In the illustrated embodiment, the patches 2 are shown in highly simplified form as rectangles. Patches 2 of that kind can be used for example as OVDs to safeguard value papers, in particular banknotes, for which purpose the OVDs or patches 2 are then each individually transferred from the carrier film 1, under the effect of heat and/pressure, on to the banknote paper or the like. In that respect, the structure and use of the stamping foil according to the invention correspond to per se known stamping foils, and for that reason there is no need for it to be described in greater detail herein.

In the embodiment shown in FIG. 1 the individual patches 2 of the stamping foil are separated from each other by intermediate spaces 4 which form free spaces and the width a of which is typically from 5 to 10 mm. It will be appreciated in addition that the patches can be of any desired shape, for example they may also have an irregular edge configuration, or they may be in the shape of an oval or a circle, in which case the intermediate spaces 4 will also be of a correspondingly irregular configuration.

FIG. 3 is a sectional view showing by way of example the structure of a decoration layer 3. The decoration layer 3 of the embodiment shown in FIG. 3 essentially comprises four layer portions, more specifically on the one hand a release or detachment layer 5 which serves to ensure easy and clean separation or detachment of the patches 2 formed by the decoration layer 3, from the carrier film 1, upon being transferred on to a substrate (not shown). The separation layer portion 5 is followed by a transparent, thermally deformable protective lacquer layer portion 6 which, at its surface remote from the carrier film 1, is provided with a spatial structure 7, for example in the form of a diffraction grating, a hologram or the like. Spatial structures 7 of that kind provide that a suitably designed OVD is of an appearance which varies in dependence on the viewing angle or the lighting angle.

In order to improve the visibility of the spatial structure or the effect produced by the spatial structure, the surface of the protective lacquer layer portion 6, which carries the spatial structure 7, is covered by a contrast layer portion 8 having a refractive index which differs considerably from that of the protective lacquer layer portion 6. The contrast layer portion 8 is in most cases a reflecting metal layer portion which can be applied for example by vapour deposition.

As its last layer portion, the decoration layer 3 includes an adhesive layer portion 9, by means of which the patches 2 are fixed to the substrate in the manner known from stamping or embossing foils. The adhesive layer portion generally involves a heat-activatable adhesive. Instead however, it is also possible to provide an adhesive which can be activated by any other form of radiation, in particular UV-radiation, or which cross-links due to the effect of that radiation, whereby the adhesion of the patches 2 to the substrate can possibly be improved.

It would also be possible to omit an adhesive layer portion 9 and instead, the substrate to which the patches 2 are to be applied could be suitably provided with an application of adhesive in the respective regions involved.

As already mentioned, the layered configuration shown in FIG. 3 only involves an example. The decoration layer 3 can generally be varied in the manner known from stamping or embossing foils, in particular for security purposes, for example by using additional, coloured, opaque or transparent lacquer layer portions and in particular by virtue of the reflection layer portion 8 being provided only in a region-wise manner.

Figure 2:
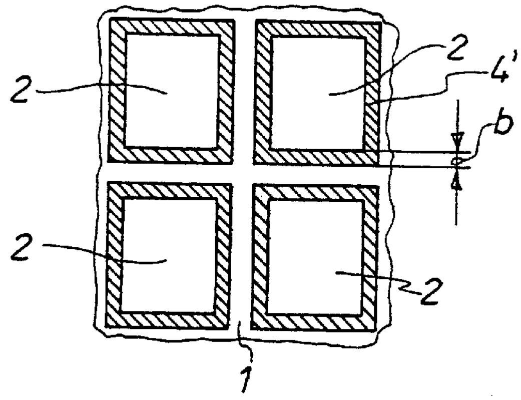
FIG. 2 is a plan view similar to FIG. 1 of another embodiment.

While, in the case of the embodiment shown in FIG. 1, the respective intermediate spaces 4 between the individual patches 2 are overall freed of the decoration layer material 3, the embodiment shown in FIG. 2 provides that the individual patches 2 are only surrounded by free spaces in the form of border portions 4' in which the decoration layer 3 is removed. In that arrangement, the border portions 4' are of a width b of at least 1 mm, preferably at least 2 mm.

The free spaces 4, 4' around the individual patches 2 can be produced in different ways. In the embodiments shown in FIGS. 1 to 3, they are produced by the action of laser radiation (diagrammatically indicated by the arrows 10 and broken lines 11). As, in the embodiment of FIG. 3, there is a continuous metal layer portion 8 which absorbs laser radiation of the most widely varying kind or, in the case of using excimer laser radiation, that radiation is also absorbed in the lacquer layer portions, the laser beams 10, 11 must be so shaped or must be so moved over the surface of the carrier film 1 that only the regions forming the free spaces are correspondingly irradiated and thus heated, so that the materials forming the decoration layer 3 are removed only in the free spaces 4, 4'.

In that respect, it is desirable to use a carrier film 1 which is transparent, and at the same time to operate with a laser whose radiation passes through the carrier film 1 without or at least practically without absorption. More specifically, in that case there is no danger of the laser radiation also damaging or indeed severing the carrier film 1. In that way it is possible to provide for particularly clean formation of the free spaces 4, 4' and in particular complete removal of the decoration layer 3.

Figure 5A:
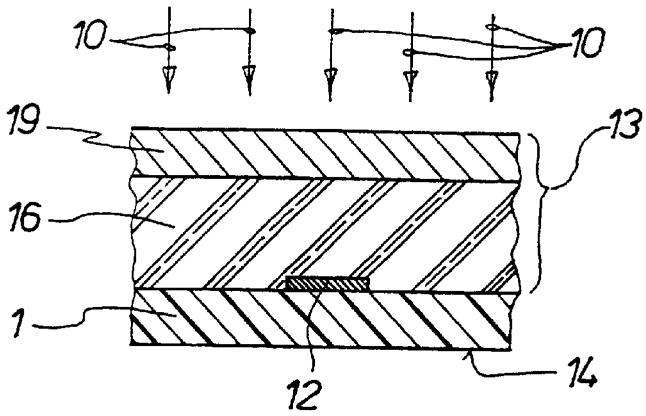
FIG. 5*a* shows the condition prior to removal of the decoration layer material to produce the free spaces.
Figure 5B:
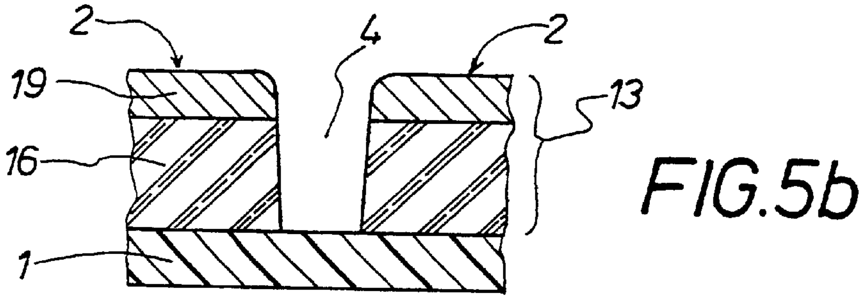
FIG. 5*b* shows the condition after removal of the decoration layer material to form the free spaces by laser radiation.

The embossing foil shown in FIGS. 5*a* and 5*b* also includes a carrier film 1. Originally (see FIG. 5*a*), disposed on the carrier film 1 over the entire surface area thereof is a decoration lacquer layer portion 16 and an adhesive layer portion 19 which jointly form the decoration layer 13. As a particular feature of this configuration, the original arrangement of the stamping foil as shown in FIG. 5*a* has, in the region in which the free spaces 4 are later to be disposed, an additional lacquer layer portion 12 which is of such a composition or construction (for example by virtue of suitable pigmentation) that at any event it absorbs laser light incident thereon (indicated by the arrows 10) while the laser light can penetrate through the lacquer layer portion 16 and the adhesive layer portion 19, possibly also only one of the two layer portions, with a comparatively low degree of absorption.

The additional absorbent lacquer layer portion 12 is considerably heated when subjected to laser radiation, and gives the result that the regions, arranged thereover, of the decoration lacquer layer portion 16 and the adhesive layer portion 19 are removed from the carrier film 1. That can be effected by the layer portion 12 for example vaporising. That then gives the arrangement shown in FIG. 5*b*.

If the original stamping foil is constructed as shown in FIG. 5*a* and if the carrier film 1 is transparent in regard to laser radiation, there is no need to effect irradiation through the adhesive layer portion 19 or the decoration lacquer layer portion 16. On the contrary, it would also be possible to effect irradiation with laser light from the opposite side, that is to say from the free surface 14 of the carrier film. At any event, the decoration layer 13 will be subjected to a corresponding effect only in the region in which the additional absorbent lacquer layer portion 12 is present, so that the decoration layer is removed there, to form the free spaces 4.

Figure 6:
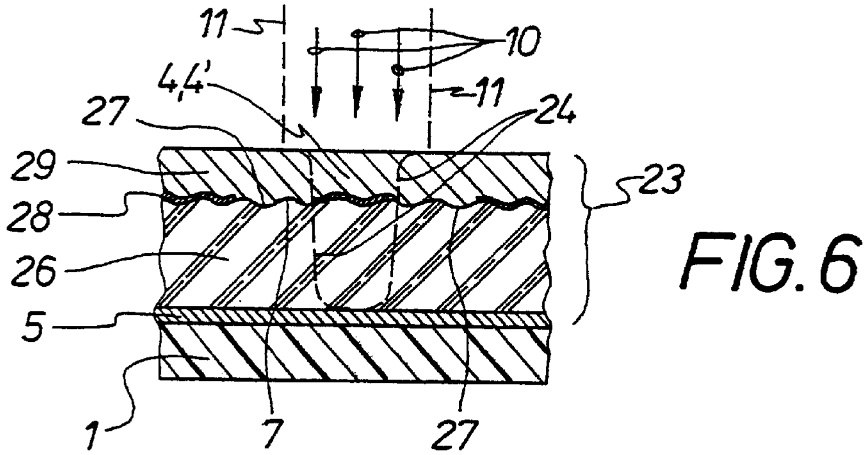
FIG. 6 is a section taken along V—V in FIG. 4 in a further embodiment of a stamping foil prior to production of the free spaces.

FIG. 6 shows a further possible way in which suitable free spaces 4 can be produced by means of laser light, wherein the free space produced is only indicated by virtue of the broken edge line 24. The stamping foil shown in FIG. 6 substantially corresponds to that shown in FIG. 3, but with the difference that metallisation 28 is not provided over the entire surface of the transparent protective lacquer layer portion 26, but only in individual regions; however, the regions where a free space 4, 4' is later to be provided have a metallisation which is then adjoined by a region 27 in which there is no metallisation.

If now, in this embodiment, laser light (arrows 10) which does not damage the carrier film 1 and the layer portions 26 and 29 is caused to impinge with a beam width indicated by the broken lines 11, in such a way that the laser beam acts on the metallisation 28 in the region of the free spaces 4, 4' to be produced, but does not extend with its lateral boundary 11 over the non-metallised regions 27, it is possible to provide that the decoration layer 23 is destroyed and consequently removed from the carrier film 1, only in the region of the intermediate space to be produced, that is to say, where the metallisation is present between the broken lines 24. In contrast, the decoration layer 23 is retained in the other regions of the metal layer portion 28, on which the laser light does not act. The advantage of the operating procedure described with reference to FIG. 6 is that guidance or focussing of the laser beam does not have to be effected as accurately as is required if, as shown in FIG. 3, the geometry of the free spaces 4, 4' is dependent only on the geometry and movement of the laser beam. Nonetheless, the embodiment of FIG. 6 affords the possibility of metallising the spatial structure 7 at least in certain regions, in order to make the spatial structure 7 particularly clearly visible in those regions.

Figure 7:
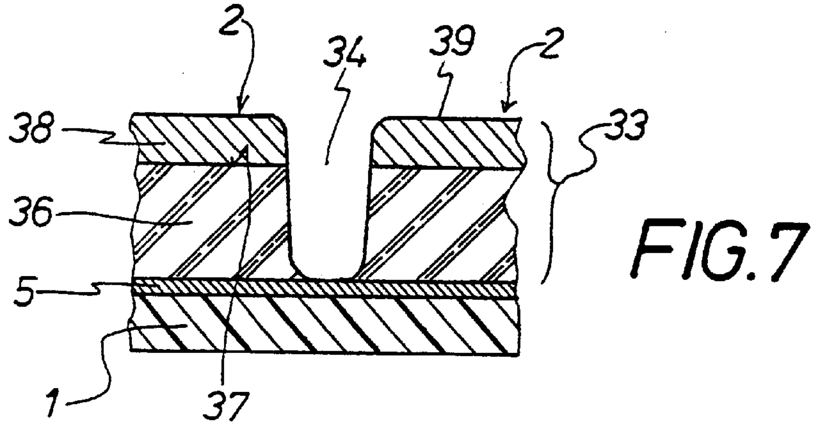
FIG. 7 is a section taken along line V—V in FIG. 4** in a third embodiment in which the free spaces are produced by an etching or dissolving procedure.

Finally, FIG. 7 serves to illustrate a possible way of producing stamping foils in accordance with the invention without using laser radiation.

The stamping foil shown in FIG. 7 also includes a conventional carrier film 1 to which a decoration layer generally indicated by reference 33 is fixed by way of a release or separation layer 5.

The decoration layer 33 comprises on the one hand a decoration lacquer layer portion 36 which in turn again comprises a plurality of layer portions and which can be suitably patterned. It would also be possible to provide in the decoration lacquer layer portion 36 or in particular at the interface 37 thereof, a spatial structure corresponding to the spatial structure 7 of the other embodiments, which structure could possibly also be provided with a reflection layer portion.

The essential difference of the stamping foil shown in FIG. 7 is now that the decoration layer 33, as an outer layer portion which is thus away from the carrier film 1, has a layer portion 38 acting as a mask. The mask indicated at 38 comprises a material, for example a lacquer, which is resistant to solvents and/or etching agents. In production of the stamping foil, the mask 38 is applied, for example by a suitable printing operation, only in the regions which are later intended to form the patches 2. When the mask has then hardened, which for example can also be effected by using UV-radiation, the surface 39 of the stamping foil, which corresponds to the mask, is exposed to the action of a suitable solvent or etching agent which admittedly does not attack the mask 38 but attacks the decoration lacquer layer portion 36. As a result, the material of the decoration lacquer layer portion 36 is removed in the free spaces 34 which are left free by the mask 38, and in a corresponding manner also subsequently, that is to say after the application of a decoration lacquer layer portion 36 covering a larger surface area, the material of the decoration layer is completely removed from the carrier film, so that, in the case of such a stamping foil configuration, the individual patches 2 can also be transferred on to a substrate completely and without flake formation, in a suitable transfer operation.

It should finally be repeated once again that the configuration of the stamping foils according to the invention basically corresponds to that of per se known stamping foils, and for that reason there is no need to include herein a detailed description of examples of the composition of the layer portions forming the individual layers of the foils. In this connection, reference may be directed for example to the composition of and the manner of applying the various layer portions, as described in DE 44 23 291 A1.

What is claimed is:

1. A stamping foil comprising a carrier film on which there is releasably arranged a decoration structure comprising a plurality of layers of decoration layer material, which is transferred onto a substrate by means of heat and/or pressure and which adhesively clings to the substrate, wherein one surface of said decoration structure is in contact with said carrier film and the opposing surface is a free surface, wherein said decoration structure is divided into individual patches which are completely separate from each other and which can be individually transferred onto said subject, wherein provided around each of the patches on the carrier film is a border comprising removable decoration layer material wherein the removable decoration material is removed to form a free space of a width of at least 1 mm along an exposed portion of the carrier film, and wherein each of said plurality of layers of decoration layer material in said individual patches extends to said border.

2. A stamping foil according to claim 1 wherein the respective free space has a width of at least 2 mm.

3. A stamping foil according to claim 1 wherein the decoration layer material is removed in the free spaces by means of laser radiation.

4. A stamping foil according to claim 3 wherein the carrier film is transparent and a portion of at least one layer of the decoration structure comprises a material which absorbs laser light.

5. A stamping foil according to claim 4 wherein the decoration structure has a metal layer portion.

6. A stamping foil according to claim 3 wherein the carrier film and/or a layer portion adjacent the carrier film is formed by a material which absorbs laser radiation.

7. A stamping foil according to claim 6 wherein the layer portion comprises a lacquer which absorbs laser radiation used for removal of the decoration structure and on which the decoration structure is releasably arranged.

8. A stamping foil according to claim 1 wherein the decoration structure further comprises at least one thermally deformable layer portion into which a spatial structure having an optical diffraction effect is embossed.

9. A stamping foil according to claim 8 wherein the thermally deformable layer portion is transparent and, on its surface which is remote from the carrier film and which carries the spatial structure, is disposed a contrast layer portion which improves the discernibility of the spatial structure.

10. A stamping foil according to claim 9 wherein the contrast layer portion comprises a reflecting metal layer portion.

* * * * *